US011846444B2

(12) United States Patent
Yun

(10) Patent No.: US 11,846,444 B2
(45) Date of Patent: Dec. 19, 2023

(54) REFRIGERATOR HAVING AIR PROCESSING APPARATUS

(71) Applicant: LG ELECTRONICS INC., Seoul (KR)

(72) Inventor: Younghoon Yun, Seoul (KR)

(73) Assignee: LG ELECTRONICS INC., Seoul (KR)

(*) Notice: Subject to any disclaimer, the term of this patent is extended or adjusted under 35 U.S.C. 154(b) by 631 days.

(21) Appl. No.: 16/965,205

(22) PCT Filed: Oct. 11, 2018

(86) PCT No.: PCT/KR2018/011961
§ 371 (c)(1),
(2) Date: Jul. 27, 2020

(87) PCT Pub. No.: WO2019/151608
PCT Pub. Date: Aug. 8, 2019

(65) Prior Publication Data
US 2021/0063050 A1 Mar. 4, 2021

(30) Foreign Application Priority Data
Feb. 5, 2018 (KR) .................. 10-2018-0013984

(51) Int. Cl.
F24F 13/28 (2006.01)
F24F 8/10 (2021.01)
(Continued)

(52) U.S. Cl.
CPC ............... F24F 13/28 (2013.01); F24F 8/10 (2021.01); F24F 8/80 (2021.01); F24F 13/20 (2013.01);
(Continued)

(58) Field of Classification Search
CPC ..... B01D 46/44; B01D 2273/30; F24F 13/28; F24F 8/10; F24F 8/80; F24F 13/20;
(Continued)

(56) References Cited

U.S. PATENT DOCUMENTS 3,509,697 A * 5/1970 Dewey .................... F24F 8/108
55/521
7,335,240 B2 * 2/2008 Gunderson ........... F25D 17/042
55/471
(Continued)

FOREIGN PATENT DOCUMENTS

CN 1504687 A 6/2004
CN 1969159 A 5/2007
(Continued)

Primary Examiner — Minh Chau T Pham
(74) Attorney, Agent, or Firm — Bryan Cave Leighton Paisner LLP

(57) ABSTRACT

A refrigerator having an air processing apparatus includes a first cabinet including a storage compartment and second cabinet mounted at one surface of the first cabinet includes an inlet hole and an outlet hole, a blower fan to blow the air drawn into the inlet hole towards the outlet hole, and a filter unit to filter the air drawn into the second cabinet via the inlet hole. A first PCB includes a first control unit to control at least one of a compressor and a pressure regulator, and a second PCB includes a second control unit to control the blower fan. A first mounting unit at one surface of the first cabinet defines a predetermined space which can accommodate the first PCB, and a second mounting unit at one surface of the second cabinet defines a predetermined space which can accommodate both the first PCB and the second PCB.

19 Claims, 5 Drawing Sheets

(51) Int. Cl.
*F24F 8/80* (2021.01)
*F24F 13/20* (2006.01)
*F25D 23/12* (2006.01)
*F25D 19/00* (2006.01)

(52) U.S. Cl.
CPC ..... *F24F 2013/205* (2013.01); *F24F 2221/18* (2013.01); *F25D 23/12* (2013.01); *F25D 2400/40* (2013.01)

(58) Field of Classification Search
CPC .. F24F 1/022; F24F 11/74; F24F 1/035; F24F 1/0358; F24F 8/108; F25D 23/12; F25D 29/005; F25D 19/00
USPC .......... 55/385.1, DIG. 34; 95/23, 14, 15, 19; 96/422, 417, 420, 421; 62/89, 183, 331, 62/126, 317, 507
See application file for complete search history.

(56) References Cited

U.S. PATENT DOCUMENTS

| | | | | |
|---|---|---|---|---|
| 7,600,388 | B2* | 10/2009 | Vestal | B01D 46/44 62/89 |
| 7,641,707 | B2* | 1/2010 | Kang | F25D 17/042 55/471 |
| 2005/0284113 | A1* | 12/2005 | Jang | B01D 46/24 55/385.1 |
| 2006/0260341 | A1* | 11/2006 | Meyvis | B01D 46/12 62/331 |
| 2007/0212284 | A1 | 9/2007 | Solomon et al. | |
| 2008/0110139 | A1* | 5/2008 | Gunderson | F25D 17/042 55/315.2 |
| 2009/0133423 | A1 | 5/2009 | Jang et al. | |
| 2010/0199706 | A1* | 8/2010 | Bischofberger | F25D 17/062 55/385.2 |
| 2015/0273376 | A1 | 10/2015 | Sohn et al. | |

FOREIGN PATENT DOCUMENTS

| | | |
|---|---|---|
| CN | 102848879 A | 1/2013 |
| CN | 102991308 A | 3/2013 |
| CN | 104603546 U | 5/2015 |
| CN | 105066244 A | 11/2015 |
| CN | 106030225 A | 10/2016 |
| CN | 206018847 U | 3/2017 |
| CN | 206771549 U | 12/2017 |
| EP | 3208562 A1 | 8/2017 |
| GB | 2415398 A | 12/2005 |
| JP | 4711924 B | 6/2011 |
| KR | 10-1999-0026513 A | 4/1999 |
| KR | 10-2005-0069321 A | 7/2005 |
| KR | 10-2005-0098124 A | 10/2005 |
| KR | 10-2006-0118240 A | 11/2006 |
| KR | 10-1259636 B1 | 4/2013 |
| KR | 10-1469418 A | 12/2014 |
| KR | 10-1803628 B1 | 12/2017 |
| WO | 2005/124251 A1 | 12/2005 |

* cited by examiner

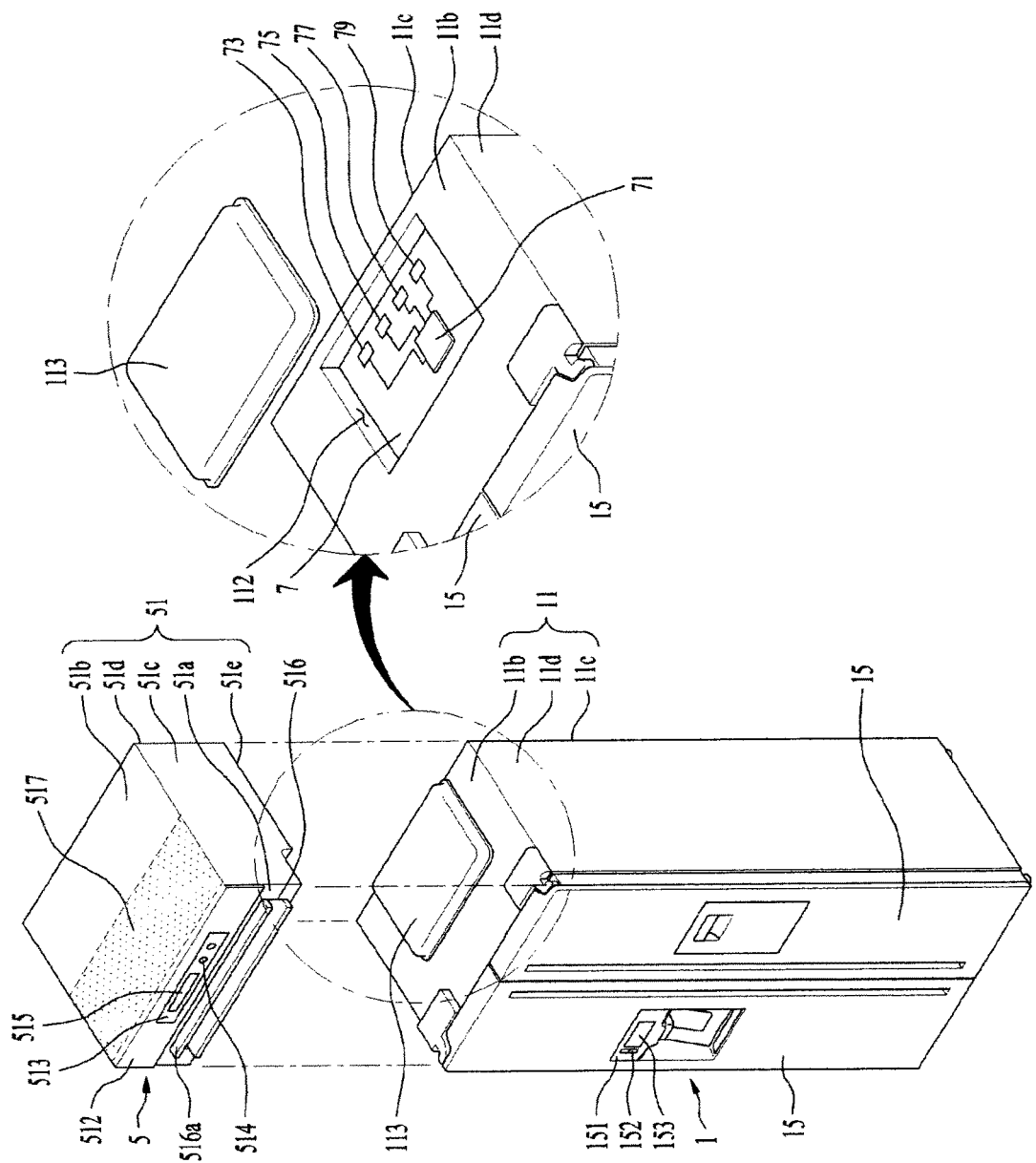
[Fig. 1]

【Figure 2】
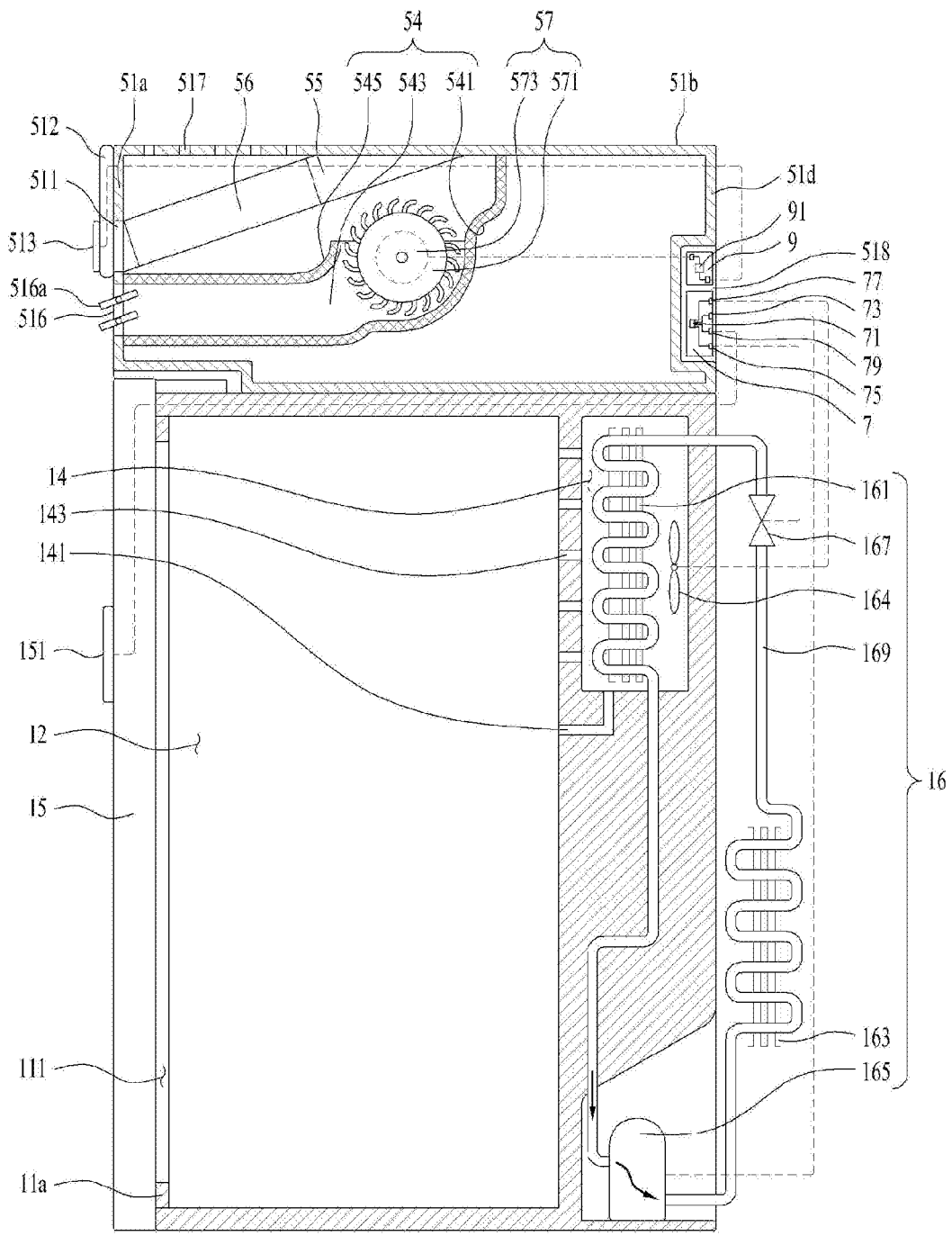

[Figure 3]
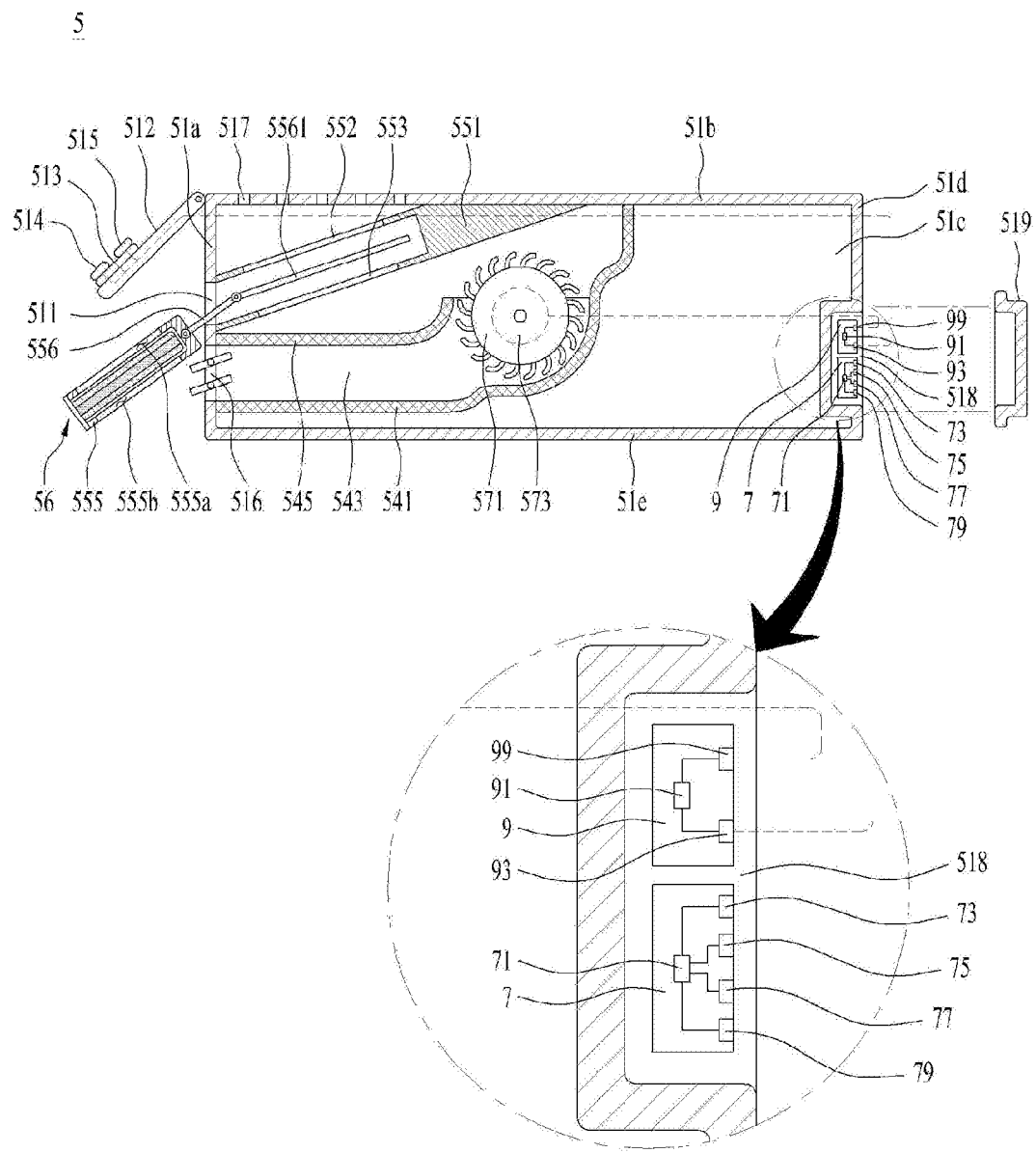

[Figure 4]
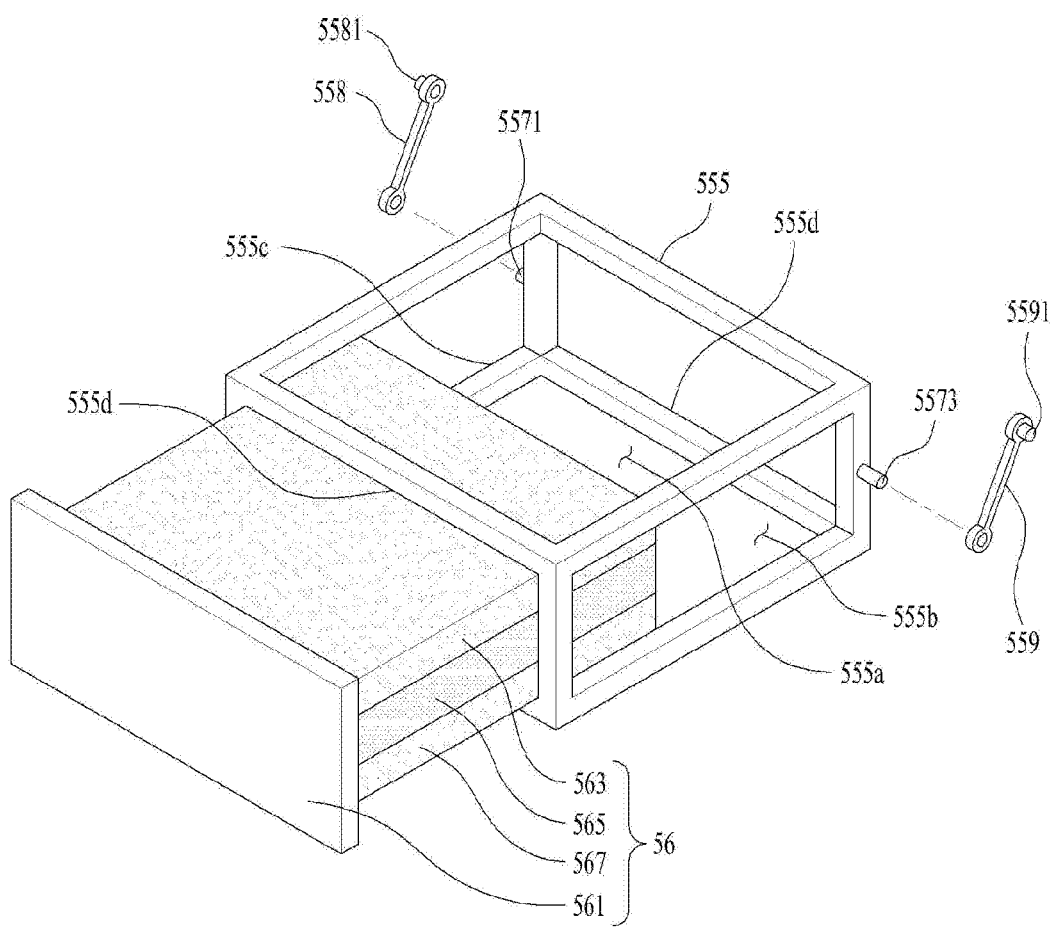

[Figure 5]
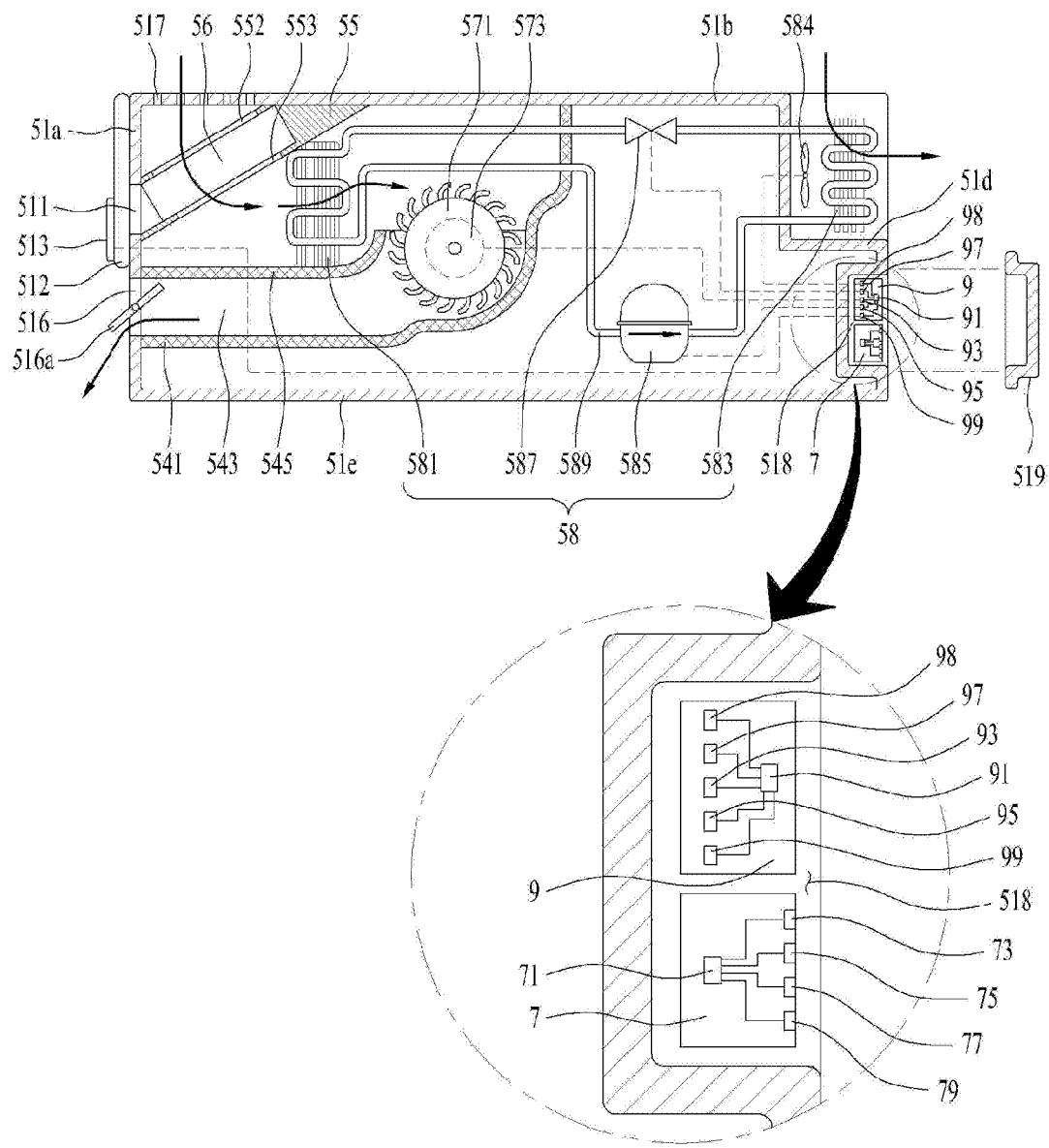

REFRIGERATOR HAVING AIR PROCESSING APPARATUS

CROSS-REFERENCE TO RELATED APPLICATION(S)

The present application is a National Phase entry pursuant to 35 U.S.C. § 371 of International Application No. PCT/KR2018/011961, filed on Oct. 11, 2018, and claims priority to and the benefit of Korean Patent Application No. 10-2018-0013984, filed with Korean Intellectual Property Office on Feb. 5, 2018, the disclosures of which are incorporated herein in their entirety by reference.

TECHNICAL FIELD

Embodiments of the present disclosure relate to a refrigerator having an air processing apparatus such as an air cleaner, an air conditioner or the like.

BACKGROUND

Generally, a refrigerator is an electric appliance configured to refrigerate or freeze stored goods such as food and an air processing apparatus is an electric appliance configured to remove dust or bad smell from air in a room by using a filter. Meanwhile, there is a conventional electric appliance configured as a refrigerator and an air processing apparatus mounted on top of the refrigerator.

The conventional electric appliance configured as the refrigerator and the air processing apparatus mounted on top of the refrigerator may include a printed circuit board (PCB) fixed on top of the refrigerator to control the refrigerator, such that it can be disadvantageously difficult to have access to the PCB in order to maintain or repair the refrigerator.

Moreover, the conventional electric appliance mentioned above has the air processing apparatus fixed on the top surface of the refrigerator. Accordingly, it is disadvantageously difficult for a user who is short to demount the filter from the air processing apparatus.

SUMMARY

Technical Problem

To overcome the disadvantages, an object of the present disclosure is to address the above-noted and other problems and to provide a refrigerator including an air processing apparatus such as an air cleaner, an air conditioner or the like.

Another object of the present disclosure is to provide a refrigerator having an air processing apparatus, of which PCB is movable to the air processing apparatus from the refrigerator.

A further object of the present disclosure is to provide a refrigerator having an air processing apparatus, of which PCB is easy to be connected to or disconnected from a power line or a control line.

A further object of the present disclosure is to provide a refrigerator having an air processing apparatus of which a filter unit is easy to be demounted from the air processing apparatus.

Technical Solution

To achieve these objects and other advantages and in accordance with the purpose of the embodiments, as embodied and broadly described herein, a refrigerator having an air processing apparatus comprising: a first cabinet comprising a storage compartment defining a space in which objects for refrigerating or freezing are stored; and a first door for opening and closing the storage compartment; a first cooling unit comprising a first refrigerant pipe defining a circulation path of a refrigerant; a first compressor configured to circulate the refrigerant along the first refrigerant pipe; a first condenser configured to condense the refrigerant by exchanging heat between the refrigerant exhausted from the first compressor and external air of the storage compartment; a first pressure regulator configured to lower the pressure of the refrigerant having passed the first condenser; and a first evaporator configured to vaporize the refrigerant having passed the first pressure regulator by absorbing heat from the internal air of the storage compartment; a second cabinet detachably mounted on one surface of the first cabinet and comprising an inlet hole and an outlet hole; a blower fan provided in the second cabinet and configured to blow the air drawn into the inlet hole toward the outlet hole; a filter unit configured to filter the air drawn into the second cabinet via the inlet hole; a first PCB comprising a first control unit implemented to control at least one of the first compressor and the first pressure regulator; a second PCB comprising a second control unit implemented to control the blower fan; a first mounting unit provided in one surface of the first cabinet and defining a predetermined space which accommodates the first PCB; and a second mounting unit provided in one surface of the second cabinet and defining a predetermined space which accommodates both the first PCB and the second PCB. Accordingly, the embodiments of the present disclosure have an effect that the first PCB provided in the refrigerator can be moved to the air processing apparatus based on the user's selection.

The refrigerator having the air processing apparatus may further comprise: a first-PCB-first-slot provided in the first PCB and having at least one of the power and control lines of the first compressor detachably secured thereto; and a first-PCB-second-slot provided in the first PCB and having at least one of the power and control lines of the first pressure regulator detachably secured thereto. Accordingly, the power or control line may be connected with or disconnected from the first PCB easily.

The refrigerator having the air processing apparatus may further comprise a second refrigerant pipe defining a circulation of a refrigerant; a second compressor configured to circulate the refrigerant along the second refrigerant pipe; a second condenser configured to condense the refrigerant by exchanging heat between the refrigerant exhausted from the second compressor and external air of the second cabinet; a second pressure regulator configured to lowering the pressure of the refrigerant having passed the second condenser; and a second evaporator configured to vaporize the refrigerant having passed the second pressure regulator by absorbing heat from the air drawn into the inlet hole. In other words, the air processing apparatus may perform the functions of the air conditioner.

The second control unit may be provided to further control at least one of the second compressor and the second pressure regulator.

The refrigerator having the air processing apparatus may further comprise a second-PCB-first-slot provided in the second PCB and having at least one of the power and control lines of the blower fan detachably secured thereto; and a second-PCB-second-slot provided in the second PCB and having at least one of the power and control lines of the second compressor detachably secured thereto; and a second-PCB-third-slot provided in the second PCB and having at least one of the power and control lines of the second pressure regulator detachably secured thereto.

The second cabinet may be detachably mounted on a top surface of the first cabinet, and the first mounting unit may be provided in the top surface of the first cabinet, and the second mounting unit may be provided in one of a rear surface and two lateral surfaces of the second cabinet.

The inlet hole may penetrate an upper surface of the second cabinet, and the outlet hole may penetrate a front surface of the second cabinet.

The refrigerator having the air processing apparatus may further comprise a filter opening penetrating a front surface of the second cabinet; and a filter mounting unit provided in the second cabinet and defining a predetermined space which accommodates the filter unit, while downwardly inclined toward the filter opening. Accordingly, the user is able to detach the filter unit easily and conveniently.

The filter mounting unit may comprise a first mounting body provided in the second cabinet and having one surface in which an inserting hole is provided; first and second communication holes penetrating upper and lower surfaces of the first mounting body, respectively; a second mounting body configured to be drawn from the first mounting body via the inserting hole and defining a predetermined space which accommodates the filter unit; a filter inserting hole penetrating the second mounting body and communicable with the filter opening; upper and lower open holes penetrating the second mounting body and communicable with the first and second communication holes, respectively; and a connecting portion connecting the first mounting body and the second mounting body with each other and preventing the second mounting body drawn from the first mounting body from separating from the second cabinet.

The connecting portion may comprise a first guider groove provided in one of the two lateral surfaces of the first mounting body and formed along a drawing direction of the second mounting body; a second guider groove provided in the other one of the two lateral surfaces of the first mounting body and formed along the drawing direction of the second mounting body; a first link having one end rotatably connected with one side of the second mounting body and the other end inserted in the first guider groove; and a second link having one end rotatably connected with the other side of the second mounting body and the other end inserted in the second guider groove.

The filter unit may comprise a first filter comprising a plurality of filter holes with a first diameter and formed in a shape which is able to be inserted in the second mounting body; and a second filter comprising a plurality of filter holes with a second diameter smaller than the first diameter and formed in a shape which is able to be inserted in the second mounting body, the second filter fixed to a lower surface of the first filter.

The filter unit may further comprise a third filter formed in a shape which is able to be inserted in the second mounting body and fixed to a lower surface of the second filter, the third filter configured to filter smell particles.

Advantageous Effects

Accordingly, the embodiments have following advantageous effects. According to at least one embodiment of the present disclosure, The refrigerator includes the air processing apparatus such as the air cleaner or the air conditioner.

Furthermore, the PCB provided in the refrigerator may be movable to the air processing apparatus.

Still further, according to the refrigerator including the air processing apparatus, the power or control line may be connected with or disconnected from the first PCB easily.

Still further, the filter unit provided in the air processing apparatus is easy to be drawn out.

Further scope of applicability of the present disclosure will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

DESCRIPTION OF DRAWINGS

The present disclosure will become more fully understood from the detailed description given herein below and the accompanying drawings, which are given by illustration only, and thus are not limitative of the present invention, and wherein:

FIGS. 1 and 2 illustrate one embodiment of a refrigerator having an air processing apparatus in accordance with the present disclosure;

FIG. 3 illustrates one embodiment of an air processing apparatus in accordance with the present disclosure;

FIG. 4 illustrates one embodiment of a filter unit; and

FIG. 5 illustrates another embodiment of the air processing apparatus.

BEST MODE

Referring to the accompanying drawings, exemplary embodiments of the present disclosure will be described in detail. Regardless of numeral references, the same or equivalent components may be provided with the same reference numbers and description thereof may not be repeated. For the sake of brief description with reference to the drawings, the sizes and profiles of the elements illustrated in the accompanying drawings may be exaggerated or reduced and it should be understood that the embodiments presented herein are not limited by the accompanying drawings.

As shown in FIG. 1, a refrigerator 100 having an air processing apparatus includes a refrigerator 1 configured to refrigerate or freeze stored objects such as food; and an air processing apparatus 5 provided in a predetermined portion of the refrigerator and configured to process air of a room in which the refrigerator 100 is installed. The air processing performed by the air processing apparatus 5 may include at least one of filtering, chilling and/or dehumidifying performed for internal air of a room in which the refrigerator is installed. FIG. 1 illustrates that the air processing apparatus 5 is mounted on a top surface of the refrigerator 1 as one embodiment. The air processing apparatus 5 in accordance with the present disclosure may be mounted to one of bottom and lateral surfaces in other embodiments.

The refrigerator 1 includes a first cabinet 11; a storage compartment 12 provided in the first cabinet and defining a space for storing food therein; and a first door 15 for opening and closing the storage compartment.

The first cabinet 11 includes a front surface 11a, a rear surface 11c, a top surface 11b and lateral surfaces 11d. The first door 15 is coupled to the front surface 11a and the air processing apparatus 5 is detachably mounted on the top surface 11b.

As shown in FIG. 2, the storage compartment 12 is defined in the first cabinet 11 and communicable with the outside of the first cabinet 11 via an opening 111 formed in the front surface 11a of the first cabinet. The first door 15 is coupled to the first cabinet 11 to open and close the opening 111.

The temperature inside the storage compartment 12 is controlled by a first cooling unit 16. Typically, the first cooling unit 16 may be configured to keep the inside of the storage compartment 12 at a room temperature or less. FIG. 2 illustrates that the first cooling unit 16 is configured to control the temperature inside the storage compartment 12 provided as one space. As one alternative example, the first cooling unit 16 may be configured to control two or more partitioned spaces at different temperatures.

The first cooling unit 16 may include a first refrigerant pipe 169 for forming a circulation path of a refrigerant; a first compressor 165 for circulating the refrigerant along the first refrigerant pipe 169; a first condenser 163 for condensing the refrigerant by exchanging heat between refrigerant exhausted from the first compressor 165 and external air of the storage compartment 12 (or emitting the heat of the refrigerant to the external air); a first pressure regulator 167 for lowering the pressure of the refrigerant which has passed the first condenser 163; and a first evaporator 161 for vaporizing the refrigerant having passed the first pressure regulator 167 by absorbing the heat from the internal air of the storage compartment 12. A plurality of heat radiant panels fixed to the first refrigerant pipe 169 may be provided as the first condenser 163 and the first evaporator 161.

The first evaporator 161 is configured to exchange heat with the internal air of the storage compartment 12, and as such, a chamber 14 may be further provided in the first cabinet 11. The first evaporator 161 may be mounted in the chamber 14.

The chamber 14 may be provided in a wall for defining the storage compartment 12 and a chamber inlet hole 141 and a chamber outlet hole 143 may be provided in the wall of the storage compartment to make the storage compartment 12 and the chamber 14 communicate with each other. FIG. 2 illustrates that the chamber inlet hole 141 and the chamber outlet hole 143 are provided as the holes penetrating the wall of the storage compartment as one example.

Meanwhile, a first fan 164 may be further provided in the chamber 14 so as to re-discharge the internal air to the storage compartment 12 after the internal air of the storage compartment 12 sequentially passes the chamber inlet hole 141, the first evaporator 161 and the chamber outlet hole 143.

A first control unit 71 for controlling the first cooling unit 16 is provided in a first PCB (7, first Printed Circuit Board). The first control unit may be an electronic processor. As shown in FIG. 1, the first PCB 7 is mounted in a first mounting unit 112 provided in the top surface 11b of the first cabinet.

The first mounting unit 112 may be provided as a groove concavely recessed from the top surface 11b of the first cabinet towards the storage compartment 12 (in other words, a groove concavely recessed towards a direction which is directed farther from the air processing apparatus). The first mounting unit 112 may be opened and closed by a mounting unit cover 113 and the mounting unit cover 113 may be fastened to the top surface of the first cabinet by using a fastening member such as a bolt or any other suitable fasteners.

The first PCB 7 may include a first-PCB-first-slot 73 and a first-PCB-second-slot 75. The first-PCB-first-slot 73 serves as means for detachably securing a control line of the first compressor 165 to the first PCB 7 and the first-PCB-second-slot 75 serves as means for detachably securing a control line of the first pressure regulator 167 to the first PCB 7.

The first compressor 165 may include a motor (in other words, a first compressor motor) driven to rotate a roller or scroll. The control line of the first compressor motor is connected with the first control unit 71 via the PCB first slot 73.

Meanwhile, the first pressure regulator 167 includes a value drive unit (e.g., a solenoid valve) configured to adjust a cross section of the first refrigerant pipe 169. A control line of the valve drive unit is connected with the first control unit 71 via the first-PCB-second-slot 75.

If a power module (not shown) of the refrigerator is provided to supply power to the first compressor 165 and the first pressure regulator 167 via the first PCB 7, the first-PCB-first-slot 73 may serve as means for securing a power line of the first compressor motor and the first-PCB-second-slot 75 may serve as means for securing a power line of the valve drive unit provided in the first pressure regulator to the first PCB.

Although not shown in the drawings, the first-PCB-first-slot 73 may serve as means for securing the power and control lines of the first compressor 165 to the first PCB and the first-PCB-second-slot 75 may serve as means for securing the power and control lines of the first pressure regulator 167 to the first PCB as one alternative example.

A first-PCB-third-slot 77 for detachably connecting at least one of the power and control lines of the first fan 164 may be further provided in the first PCB 7. The first fan 164 may be configured as a motor; and an impeller which is rotatable by the motor. The motor may be provided with power by the power module of the refrigerator via the first-PCB-third-slot 77 and receive a control signal on revolutions per minute (RPM) or direction transmitted by the first control unit 71 via the first-PCB-third-slot 77.

A first control panel 151 may be provided at the first door 15. The first control panel 151 may include a first input unit 152 for receiving an input control command necessary to control the refrigerator; and a first display unit 153 for displaying a control signal which is selectable by the user or execution information of the control command selected by the user.

The first PCB 7 may further include a first-PCB-fourth-slot 79 for detachably securing at least one of the power and control lines of the first control panel 151.

When the power and control lines of the first control panel 151 are connected with the first control unit 71 and the power module of the refrigerator via the first-PCB-fourth-slot 79, the first input unit 152 and the first display unit 153 may be supplied with power by the power module of the refrigerator via the first-PCB-fourth-slot 79. Also, the first control unit 71 may receive the control signal transmitted from the first input unit 152 and the first display unit 153 may receive the control signal transmitted by the first control unit 71 via the first-PCB-fourth-slot 79.

One reason why the plurality of the slots 73, 75, 77 and 79 are provided in the first PCB 7 is to facilitate the repair and maintenance of the refrigerator 100 in accordance with the present disclosure. In other words, since the air processing apparatus 5 may be fixedly mounted on the top surface 11b of the refrigerator 1, it is preferred that the first PCB 7 including the first control unit 71 is provided in the area which is accessible even without detaching the air processing apparatus 5 from the refrigerator 1, considering the checking or repairing of the refrigerator. To realize the effect of an easy location change of the first PCB 7, the slots 73, 75, 77 and 79 are provided in the first PCB 7. Accordingly, the first PCB 7 fixedly mounted on the top surface of the first cabinet is able to be moved and installed in the air processing apparatus 5, which will be described in detail later.

The air processing apparatus 5 provided in the refrigerator 100 in accordance with the present disclosure may be provided as an air cleaner configured to remove dust, bacteria or smells which are contained in the air of the room by filtering the room air or an air conditioner configured to lower the humidity and temperature of the room air. FIG. 2 illustrates that the air processing apparatus 5 is an air cleaner and FIG. 5 illustrates that the air processing apparatus 5 is an air conditioner.

The air processing apparatus 5 shown in FIG. 2 may include a second cabinet 51 detachably mounted on the top surface 11b of the first cabinet 11; an inlet hole 517 and an outlet hole 516 for making the inside communicate with the outside of the second cabinet 51; a blower fan 57 provided in the second cabinet 51 and configured to blow the air drawn via the inlet hole 517 toward the outlet hole 516; and a filter unit 56 for filtering the air drawn into the second cabinet 51.

The second cabinet 51 may be provided in any shape. The second cabinet 51 shown in FIG. 2 may include a front surface 51a, a rear surface 51d, an upper surface 51b and two lateral surfaces 51c and a lower surface 51e. The front surface 51a of the second cabinet is provided in a direction in which the first door 15 of the refrigerator is located and the two lateral surfaces 51c are provided to connect the front surface and the rear surface with each other. The lower surface 51e is provided in a direction toward the top surface 11b of the refrigerator.

In this instance, the inlet hole 517 may be provided as a plurality of through-holes penetrating the upper surface 51b of the second cabinet and the outlet hole 516 may be provided as a plurality of through-holes penetrating the front surface 51a of the second cabinet.

A louver 516a for controlling the flow direction of the exhausted air may be further provided in the outlet hole 516. As shown in the drawing, the louver 516a may be a plurality of boards arranged in parallel with a width direction of the outlet hole 516 to adjust a vertical outlet angle of the air. As another alternative example, the louver 516a may be a plurality of boards arranged in parallel with a height direction of the outlet hole 516 to adjust a horizontal outlet angle of the air.

The blower fan 57 is provided in a duct 54 for guiding the air drawn via the inlet hole 517 toward the outlet hole 516. The duct 54 may include a partition wall 541 for partitioning off an internal space of the second cabinet 51 into several spaces; a first lateral wall 543 and a second lateral walls (not shown) which are provided in both ends of the partition wall facing each other; and an upper wall 545 fixed to upper ends of the first and second lateral walls, spaced a preset distance apart from the partition wall 541.

The upper wall 545, the first lateral wall and the second lateral wall are extended from the outlet hole 516 toward the inside of the upper surface 51b of the second cabinet. Different from the partition wall 541, they are not connected with the upper surface 51b of the second cabinet.

The blower fan 57 may include an impeller 571 provided in an inlet of the duct and a motor 573 for rotating the impeller. The duct inlet may be an open surface defined by a free end of the upper wall 545, a free end of the first lateral wall 543 and a free end of the second lateral wall.

The filter unit 56 may be provided in any position, capable of filtering the air drawn into the second cabinet 51. For example, the filter unit 56 may be located between the inlet hole 517 and the impeller 571 and filter the air which is supplied to the impeller 571. Alternatively, the filter unit may be located between the impeller 571 and the outlet hole 516 and filter the air having passed the impeller. FIG. 2 illustrates that the filter unit 56 is located between the inlet hole 517 and the impeller 571.

Accordingly, when the impeller 571 is rotated by the motor 573, external air may be drawn into the second cabinet 51 via the inlet hole 517 and the drawn air is exhausted outside the second cabinet via the duct inlet and the outlet hole 516. The air passes the filter unit 56 during this process, so that the dust or smells contained in the room air can be filtered and removed by the filter unit 56.

A second control unit 91 for controlling the blower fan 57 may be provided in a second PCB (9, a second Printed Circuit Board). The second control unit may be an electronic processor. The second PCB 9 may include a second-PCB-first-slot 93 for detachably securing a control line of the motor 573 provided in the blower fan 57, so as to facilitate the assembly of the air processing apparatus 5 and the checking or repairing of the air processing apparatus 5.

In this instance, the control line of the motor 573 is connected with the second control unit 91 via the second-PCB-first-slot 93. If the power module (not shown) of the air processing apparatus is provided to supply power to the motor 573 via the second PCB 9, the second-PCB-first-slot 93 may serve as means for securing a power line of the motor 573 to the second PCB.

Meanwhile, the second PCB 9 may be mounted in a second mounting unit 518 provided in one of the lateral surfaces 51c and rear surface 51d. FIG. 2 illustrates that the second mounting 518 is provided in the rear surface 51d of the second cabinet.

The second mounting 518 may be provided in a preset size and shape which can accommodate both of the first and second PCBs 7 and 9, considering that the air processing apparatus 5 is mounted to the refrigerator 1 having the first PCB 7 secured to the top surface 11b of the first cabinet. In other words, the second mounting unit 518 may serve as means for making it possible to change the position of the first PCB 7, in case the user installs the air processing apparatus 5 on the top surface of the refrigerator 1 after purchasing only the air processing apparatus 5 or a manufacturer mounts the air processing apparatus 5 on the top surface 11b of the first cabinet having the first PCB 7 secured thereto.

Accordingly, when mounting the air processing apparatus 5 on the top surface 11b of the refrigerator 1, a worker detaches the power and control lines secured to the slots 73, 75, 77 and 79 of the first PCB and demount the first PCB 7 from the refrigerator. Hence, the worker may move the first PCB 7 to the second mounting unit 518 and then re-connect the power and control lines of the first control panel 151 and the first cooling unit 16 to the slots 73, 75, 77 and 79 of the first PCB, respectively.

Meanwhile, to prevent damage to the first PCB 7 and the second PCB 9, the second mounting unit 518 shown in FIG. 3 may be opened and closed by a cover 516.

The filter unit 56 may be detachably provided in the second cabinet 51 so as to facilitate the cleaning of the filter unit 56. For that, a filter mounting unit 55 may be further provided in the second cabinet to provide a predetermined space for accommodating the filter unit 56.

To allow the user to easily detach or demount the filter unit 56 from the filter mounting unit 55, the filter unit 56 may be drawn from the front surface 51a of the second cabinet. For that, a filter opening 511 is provided at the front surface 51a of the second cabinet and the filter mounting unit 55 is in communication with the filter opening 511. The filter opening 511 may be opened and closed by a second door rotatably coupled to the second cabinet 51.

A second control panel 513 may be provided at the second door 512. The control panel 513 may include at least one of a second input unit 514 and a second display unit 515. The second input unit 514 may be means for receiving the user's input of a control command to control the air processing apparatus 5 and the second display unit 515 may be means for displaying a control command which is selectable by the user or execution information of the control command selected by the user.

The second PCB 9 may further include a second-PCB-fifth-slot 99 for detachably securing at least one of the power and control lines of the second control panel 513.

When the power and control lines of the second control panel 513 are connected with the second control unit 91 and the power module of the air processing apparatus via the second-PCB-fifth-slot 99, the second input unit 514 and the second display unit 515 may be supplied power by the power module of the air processing apparatus via the second-PCB-fifth-slot 99. The second control unit 91 may receive the control signal transmitted from the second input unit 514 via the second-PCB-fifth-slot 99 and the second display unit 515 may receive the control signal transmitted by the second control unit 91 via the second-PCB-fifth-slot 99.

Considering a convenience of a user who is relatively short, it is more advantageous to provide the filter opening 511 at a lower position. Considering the cleaning periods of the filter unit 56, it is more advantageous to provide the filter unit 56 with a larger area. Accordingly, it is preferred that the filter mounting unit 55 is downwardly inclined toward the filter opening 511. In other words, one end of the filter mounting unit 55 may be fixed to the front surface 51a of the second cabinet and be able to communicate with the filter opening 511. The other end of the filter mounting unit 55 may be fixed to the upper surface 51b of the second cabinet. In this instance, the inlet hole 517 may be located in a space over the filter mounting unit 55 and the space is defined by the upper surface 51b of the second cabinet.

Considering the short user's use friendliness, the filter mounting unit 55 may include a first mounting body 551 fixed to the second cabinet 51; a second mounting body 555 defining a space for accommodating the filter unit 56 and able to be drawn from the first mounting body 551; and a connecting portion 556 for preventing the second mounting body 555 drawn from the first mounting body 551 from separating from the second cabinet 51.

The first mounting body 551 may be provided in any shape capable of accommodating the second mounting body 555. FIG. 3 illustrates that the first mounting body 551 is provided in a hexahedron shape.

An inserting hole is provided at one surface of the first mounting body 551 to insert the second mounting body 555 therein. A first communication hole 552 and a second communication hole 553 are provided at an upper surface and a lower surface of the first mounting body 551, respectively, while penetrating the first mounting body.

The second mounting body 555 may be provided in any shape capable of accommodating the filter unit 56 and be drawn from the first mounting body 551. FIG. 4 illustrates a second mounting body 555 provided in a hexahedron shape which is hollow inside.

As shown in FIG. 4, a filter inserting hole 555d is provided at a front surface of the second mounting body 555 and communicable with the filter opening 511. An upper open hole 555a and a lower open hole 555b are provided in the upper and lower surfaces of the second mounting body 555, respectively, and communicable with the first communication hole 552 and the second communication hole 553, respectively.

Moreover, two lateral surface open holes 555c may be further provided in both lateral surfaces of the second mounting unit, respectively, to exhaust the air having passed the filter unit 56 outside of the second mounting body 555 rapidly. In this instance, two lateral surface communication holes (not shown) in communication with the two lateral surface open holes 555c may be further provided in both lateral surfaces of the first mounting body 551, respectively.

The connecting portion 556 may serve as means for facilitating the short user's access to the filter unit 56 by preventing the second mounting body 555 from separating from the second cabinet 51 even when the second mounding body 555 is drawn from the first mounting body 551.

The connecting portion 556 may include a first guider groove (5561, see FIG. 3) and a second guider groove which are provided at the lateral surfaces of the first mounting body 551 facing each other, respectively, and formed along a drawing direction of the second mounting body 555; a first link 558 having one end rotatably connected to one side of the second mounting body 555 and the other end inserted in the first guider groove 5561; and a second link 559 having one end rotatably connected with the other side of the second mounting body 555 and the other end inserted in the second guider groove.

A first link coupling hole may be provided in one end of the first link 558 to have a first projection 5571 of the second mounting body 555 inserted therein. A first link projection 5581 may be provided in the other end of the first link 558 to be inserted in the first guider groove 5561.

Similarly, a second link coupling hole may be provided in one end of the second link 559 to have a second projection 5573 of the second mounting body 555 inserted therein. A second link projection 5591 may be provided in the other end of the second link 559 to be inserted in the second guider groove.

The filter unit 56 may include a filter frame 561; a first filter 563 fixed to the filter frame and inserted in the second mounding body 555; and a second filter 565 fixed to a lower surface of the first filter and inserted in the second mounting body 555. The filter frame 561 may be provided in diverse shapes capable of fixing the filters 563 and 565.

The first filter 563 may be a filter capable of filtering relatively large particles of foreign substances and the second filter may be a filter capable of filtering relatively small particles of foreign substances. For that, a diameter (a first diameter) of a filter hole provided in the first filter 563 may be set larger than a diameter (a second diameter) of a filter hole provided in the second filter 565.

Moreover, the filter unit 56 may further include a third filter 567 fixed to a lower surface of the second filter 565 and inserted in the second mounting body 555. The third filter 567 may be configured to filter smell particles.

FIG. 5 illustrates an air processing apparatus 5 provided as an air conditioner. In this embodiment, the air processing apparatus 5 is characterized in that a second cooling unit 58 is further provided.

The second cooling unit 58 may include a second refrigerant 589 for forming a circulation path of a refrigerant; a second compressor 585 for circulating the refrigerant along the second refrigerant pipe 589; a second condenser 583 for condensing the refrigerant by exchanging heat between the refrigerant exhausted from the second compressor 585 and external air of the second cabinet 51; a second pressure regulator 587 for lowering the pressure of the refrigerant having passed the second condenser 583; and a second evaporator 581 for vaporizing the refrigerant having passed the second pressure regulator 587 by absorbing heat from the air drawn into the inlet hole 517.

A plurality of heat radiant panels fixed to the second refrigerant pipe 589 may be provided as the second condenser 583 and the second evaporator 581. The second evaporator 581 may be arranged between the filter unit 56 and the impeller 571 and the second condenser 583 may be fixed to the outside of the second cabinet 51.

To facilitate the heat exchange between the refrigerant passing through the second condenser 583 and the air, the second cooling unit 58 may further include a second fan 584 for blowing air toward the second condenser 583.

The second cooling unit 58 may be controlled by the second control unit 91 provided in the second PCB 9 described above. In other words, the second compressor 585, the second pressure regulator 587 and the second fan 584 may be controlled by the second control unit 91.

In this instance, the second PCB 9 may further include a second-PCB-second-slot 95 for detachably connecting at least one of the power and control lines of the motor provided in the second compressor 585 with the second PCB 9; a second-PCB-third-slot 97 for detachably connecting at least one of the power and control lines of the valve drive unit provided in the second pressure regulator 587 with the second PCB 9; and a second-PCB-fourth-slot 98 for detachably connecting at least one of the power and control lines of the motor provided in the second fan 584.

The other elements except the second cooling unit 58 mentioned above are equal to the corresponding elements of the air processing apparatus 5 mentioned above, referring to FIGS. 2 through 4, and the repeated description is omitted accordingly.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

The invention claimed is:

1. A refrigerator having an air processing apparatus comprising:
   a first cabinet comprising a storage compartment defining a space in which objects for refrigerating or freezing are stored; and a first door for opening and closing the storage compartment;
   a first cooling unit comprising a first refrigerant pipe defining a circulation path of a refrigerant; a first compressor to circulate the refrigerant along the first refrigerant pipe; a first condenser to condense the refrigerant by exchanging heat between the refrigerant exhausted from the first compressor and an external air of the storage compartment; a first pressure regulator to lower a pressure of the refrigerant having passed the first condenser; and
   a first evaporator to vaporize the refrigerant having passed the first pressure regulator by absorbing heat from an internal air of the storage compartment;
   a second cabinet mounted at one surface of the first cabinet and comprising an inlet hole and an outlet hole;
   a blower fan provided in the second cabinet to blow air drawn into the inlet hole towards the outlet hole;
   a filter unit to filter the air drawn into the second cabinet via the inlet hole;
   a first PCB comprising a first control unit implemented to control at least one of the first compressor and the first pressure regulator;
   a second PCB comprising a second control unit implemented to control the blower fan;
   a first mounting unit provided at one surface of the first cabinet and defining a predetermined space which can accommodate the first PCB; and
   a second mounting unit provided at one surface of the second cabinet and defining a predetermined space which can accommodate both the first PCB and the second PCB,
   wherein the second cabinet is detachably mounted at a top surface of the first cabinet, and the first mounting unit is provided at the top surface of the first cabinet, and
   the second mounting unit is provided at one of a rear surface and a lateral surface of the second cabinet.

2. The refrigerator having the air processing apparatus of claim 1, further comprising:
   a first-PCB-first-slot provided at the first PCB and having at least one of power and control lines of the first compressor detachably secured thereto; and
   a first-PCB-second-slot provided at the first PCB and having at least one of power and control lines of the first pressure regulator detachably secured thereto.

3. The refrigerator having the air processing apparatus of claim 1, further comprising:
   a second refrigerant pipe defining a circulation of another refrigerant;
   a second compressor to circulate the another refrigerant along the second refrigerant pipe;
   a second condenser to condense the another refrigerant by exchanging heat between the another refrigerant exhausted from the second compressor and an external air of the second cabinet;
   a second pressure regulator to lower a pressure of the another refrigerant having passed the second condenser; and
   a second evaporator to vaporize the another refrigerant having passed the second pressure regulator by absorbing heat from the air drawn into the inlet hole.

4. The refrigerator having the air processing apparatus of claim 3, wherein the second control unit is provided to further control at least one of the second compressor and the second pressure regulator.

5. The refrigerator having the air processing apparatus of claim 4, further comprising:
   a second-PCB-first-slot provided at the second PCB and having at least one of power and control lines of the blower fan secured thereto;
   a second-PCB-second-slot provided at the second PCB and having at least one of power and control lines of the second compressor secured thereto; and a second-PCB-third-slot provided at the second PCB and having at least one of power and control lines of the second pressure regulator secured thereto.

6. The refrigerator having the air processing apparatus of claim 1, wherein the inlet hole penetrates an upper surface of the second cabinet, and the outlet hole penetrates a front surface of the second cabinet.

7. The refrigerator having the air processing apparatus of claim 1, further comprising:
   a filter opening penetrating a front surface of the second cabinet; and
   a filter mounting unit provided in the second cabinet and defining a predetermined space to accommodate the filter unit, and downwardly inclined towards the filter opening.

8. The refrigerator having the air processing apparatus of claim 7, wherein the filter mounting unit comprises,
   a first mounting body provided in the second cabinet and having one surface in which an inserting hole is provided;
   first and second communication holes penetrating upper and lower surfaces of the first mounting body, respectively;
   a second mounting body capable of being drawn from the first mounting body via the inserting hole and defining a predetermined space which accommodates the filter unit;
   a filter inserting hole penetrating the second mounting body and communicable with the filter opening;
   upper and lower open holes penetrating the second mounting body and communicable with the first and second communication holes, respectively; and
   a connecting portion connecting the first mounting body and the second mounting body with each other to prevent the second mounting body drawn from the first mounting body from separating with the second cabinet.

9. The refrigerator having the air processing apparatus of claim 8, wherein the connecting portion comprises,
   a first guider groove provided in one of two lateral surfaces of the first mounting body and formed along a drawing direction of the second mounting body;
   a second guider groove provided in an other one of the two lateral surfaces of the first mounting body and formed along the drawing direction of the second mounting body;
   a first link having one end rotatably connected with one side of the second mounting body and an other end inserted in the first guider groove; and
   a second link having one end rotatably connected with an other side of the second mounting body and an other end inserted in the second guider groove.

10. The refrigerator having the air processing apparatus of claim 9, wherein the filter unit comprises,
    a first filter comprising a plurality of filter holes with a first diameter and formed in a shape which is insertable in the second mounting body; and
    a second filter comprising a plurality of filter holes with a second diameter smaller than the first diameter and formed in a shape which is insertable in the second mounting body, the second filter fixed to a lower surface of the first filter.

11. The refrigerator having the air processing apparatus of claim 10, wherein the filter unit further comprises,
    a third filter formed in a shape which is insertable in the second mounting body and fixed to a lower surface of the second filter, the third filter to filter smell particles.

12. The refrigerator of claim 1, wherein the first PCB is disposed in the first mounting unit when the second cabinet is removed from the first cabinet.

13. The refrigerator of claim 1, wherein the first PCB is disposed in the second mounting unit when the second cabinet is mounted at the one surface of the first cabinet.

14. The refrigerator having the air processing apparatus of claim 1, further comprising:
    a cover to cover the first mounting unit.

15. The refrigerator having the air processing apparatus of claim 1, further comprising:
    a cover to cover the second mounting unit.

16. The refrigerator of claim 2, wherein
    the at least one of the power and control lines of the first compressor is secured to the first-PCB-first-slot provided at the first PCB, and the at least one of the power and control lines of the first pressure regulator is secured to the first-PCB-second-slot provided at the first PCB when the first PCB is disposed at the first mounting unit.

17. The refrigerator having the air processing apparatus of claim 2, wherein
    the at least one of the power and control lines of the first compressor is secured to the first-PCB-first-slot provided at the first PCB, and the at least one of the power and control lines of the first pressure regulator is secured to the first-PCB-second-slot provided at the first PCB when the first PCB is disposed at the second mounting unit.

18. The refrigerator having the air processing apparatus of claim 5, wherein
    the at least one of the power and control lines of the blower fan is detachably secured to the second-PCB-first-slot provided at the second PCB;
    the at least one of the power and control lines of the second compressor is detachably secured the second-PCB-second-slot provided at the second PCB; and
    the at least one of the power and control lines of the second pressure regulator is detachably secured a second-PCB-third-slot provided at the second PCB.

19. The refrigerator having the air processing apparatus of claim 1, further comprising:
    a louver provided at the outlet hole to control a flow direction of the air blown out of the outlet hole.

* * * * *